Patented June 24, 1952

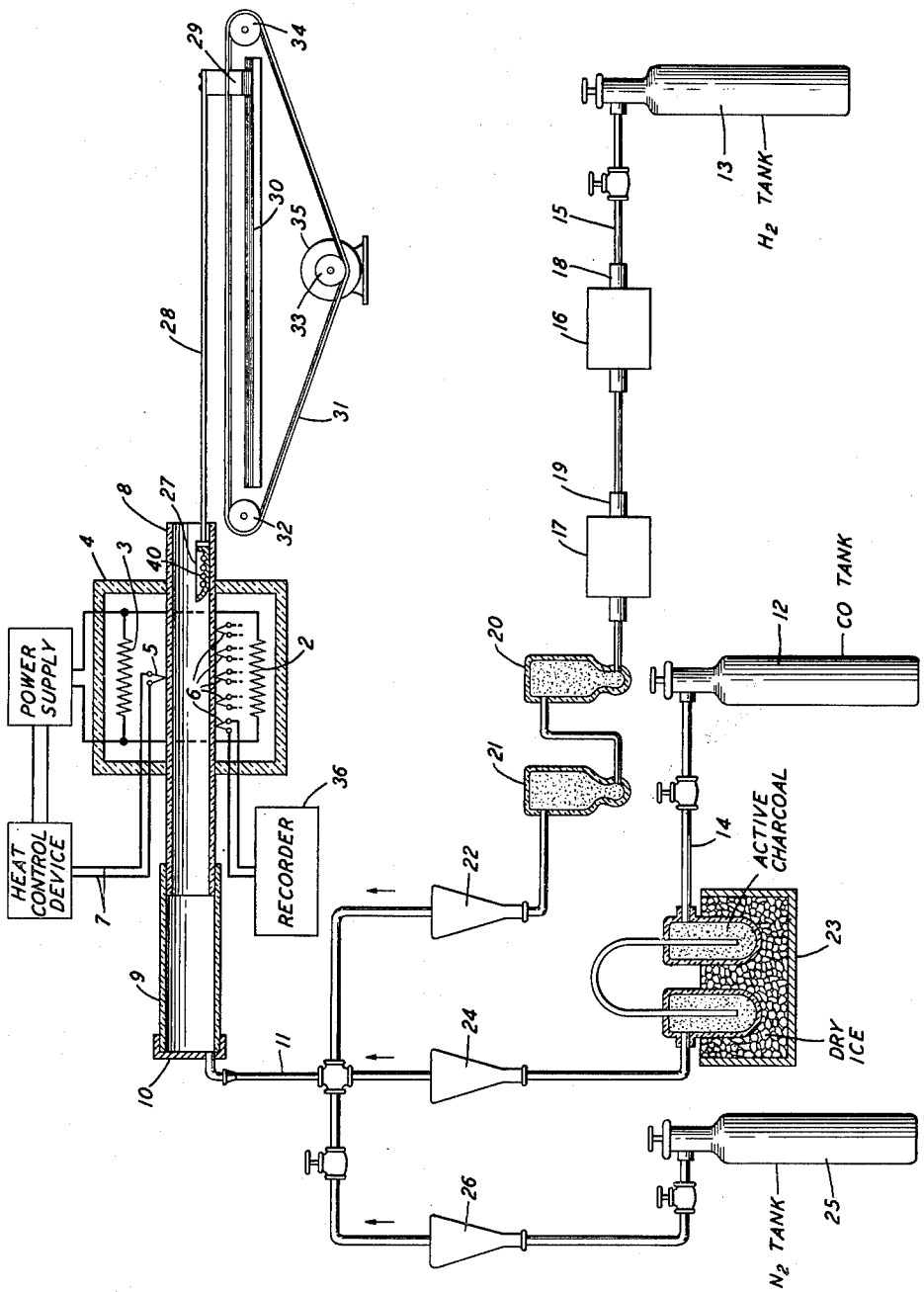

2,601,373

UNITED STATES PATENT OFFICE 2,601,373

METHOD OF MAKING SILICON CARBIDE CIRCUIT ELEMENTS

Hans F. Dienel, Berkeley Heights, and Gordon K. Teal, Summit, N. J., assignors to Bell Telephone Laboratories, Incorporated, New York, N. Y., a corporation of New York Application May 6, 1950, Serial No. 160,542

9 Claims. (Cl. 25—157)

1

This invention relates to a process for making electrical resistance material and more specifically to a method of firing electrical resistance material containing silicon carbide as one of the constituents thereof.

In the prior art there are methods of manufacturing electrical resistance materials containing silicon carbide but there has always been experienced the difficulty of non-uniformity of electrical properties in the resultant product. This non-uniformity of electrical properties is undesirable from a commercial standpoint since it requires the manufacture of many units in order to get a considerably smaller number which have electrical properties falling within a given tolerance. Furthermore, the methods disclosed in the prior art are often slow and relatively expensive.

It is an object of this invention to produce silicon carbide devices having uniform electrical properties within relatively close tolerances.

A further object is the production of silicon carbide conductive devices for which the current varies as a higher power of the applied voltage than do silicon carbide conductive devices made by processes known heretofore.

Another object of the invention is to increase the rate of firing by a factor of several times as compared with other known methods.

Other objects are to produce silicon carbide conductive devices of a higher quality than has heretofore been possible, and the improvement of processes for making electrical resistance units generally.

A feature of the invention pertains to the firing of silicon carbide conductive devices in a furnace having in its firing chamber an atmosphere comprising from twenty to one hundred per cent of carbon monoxide and the remainder hydrogen. The temperature of the furnace during the heat treatment firing period is kept within the range of 1000° C. to 1400° C., most advantageously between 1200° C. to 1300° C. with a tolerance of about plus or minus 4° C. It is to be noted however that lower or higher temperatures may be used, but with slightly less desirable results.

These and other features and objects of the invention will be more clearly understood from the following detailed description in conjunction with the drawing which illustrates an apparatus designed to carry out the invention described herein.

In the drawing heater elements 2 and 3 are contained in furnace 4. Thermocouple 5 connected to a heat control device through leads 7

2 controls the temperature of the furnace 4. Carbon monoxide and hydrogen are contained in tanks 12 and 13 respectively. The temperature of the furnace at various points therein is recorded on recorder 36 by means of thermocouples 6. The hydrogen gas is passed through lead 15, through tubes 18 and 19 containing copper catalyst heated by furnaces 16 and 17 respectively, through tanks 20 and 21 containing phosphorous pentoxide, through flow meter 22, tube 11, glass tubing 9 and through ceramic tube 8 to the outside atmosphere. Tank 12 contains carbon monoxide which flows through tube 14, purifier 23, flow meter 24, lead 11, tube 9, and ceramic tube 8 to the outside atmosphere. Tank 25 contains nitrogen which is used to flush out the system. The nitrogen flow is monitored by flow meter 26. Element 10 is a removable cap to allow extraction of boats 27 as they leave the firing area.

The boats such as 27 are propelled through the furnace by a rod 28 which is secured to carriage 29 which in turn rides on track 30. Belt 31 which is friction driven by motor 35, is fastened to carriage 29 and is looped over pulleys 32 and 34. Operation of motor 35 will drive belt 31 which in turn will cause rod 28 to move into the ceramic furnace tube 8, pushing the boats before it. It is to be noted that a chain and gears may be used instead of the belt and pulleys. To reload the furnace it is necessary to pull rod 28 out of tube 8 and insert the desired number of boats in tube 8. In actual practice the exhaust gases are burned at the end of the ceramic tube 8 and, if desired, a succession of loaded boats may slowly be pushed through the flame and into the furnace tube.

In a specific and preferred embodiment, the silicon carbide resistance elements are made of a material which before the heat treatment is comprised of a mixture of sixty parts by weight silicon carbide, two parts by weight graphite, one hundred parts by weight water, and forty parts by weight of clay. The clay is composed of ingredients in the following approximate proportions: 47.7% $SiO_2$, 36% $Al_2O_3$, 0.9% $Fe_2O_3$, 0.6% CaO, 1.0% MgO, 1.2% $Na_2O$, 3.6% $K_2O$, 1.4% $TiO_2$, 1.9% MnO, 0.7% C, and 5% $H_2O$. This material can be formed into various desired shapes such as a disc for example, which, upon heat treating will become silicon carbide conductive elements.

Before the discs are heat treated they should be dried for 16 hours or more at about 110° C. to 130° C. and then stored in dry, moisture proof containers before cooling to room temperature.

The furnace to be used is preferably an electrical furnace since a close tolerance of plus or minus 4° C. should be maintained the range from 1200° C. to 1300° C. Constant temperature in the furnace 4 is important because a variation of 1° C. in the furnace temperature will result in a change of approximately one per cent in the conductivity of the resultant varistor unit.

The temperature gradients in the plane perpendicular to the direction of the motion of the discs through the furnace 4 should be less than 1° C. in the area occupied by the discs. Along the direction of the motion of the discs the temperature function in the firing space is inseparable from the rate of motion. This requirement will be discussed in more detail later.

The furnace tube should be impervious to the diffusion of gases, and must be chemically inert with respect to the atmosphere present under the firing conditions. The tube 8, the containers 27 used to hold the varistor discs and the push rod 28 must be substantially inert to each other at the higher temperatures involved in the firing of the discs. Means 12, and 13 for continuously injecting controlled amounts of hydrogen and carbon monoxide into the furnace is provided. Means 25 is provided as a supply of an inert gas for removing the above-mentioned gases and other gaseous products arising from the firing of the varistor materials. With respect to the direction of flow of the gas within the furnace it has been found advantageous to cause it to flow opposite the direction of motion of the silicon carbide resistance discs, if a continuous run method of firing is employed.

Accuracy of control and metering of the flow of hydrogen and carbon monoxide should be of the order of plus or minus one per cent. In the preferred embodiment of the invention the ratio of hydrogen to carbon monoxide is about 1.00. Factors such as tube diameter, length of the hot zone, and rate of firing, determine the amount of total flow of hydrogen and carbon monoxide.

If a continuous run method of firing the discs is utilized, the varistor discs such as disc 40 should be uniformly spaced from each other in their travel through the furnace, and their rate of travel should be constant or variable at the will of the operator.

Preparatory to the firing of the discs they can be placed in an upright position on a container or boat which can be pushed through the furnace tube by mechanical means such as a heat resistant rod 28 which is substantially chemically inert with respect to the other materials within the furnace. A driving mechanism with a constant speed motor is used, as discussed hereinbefore, to provide the force to push the rod 28. In the continuous run method it is possible to use both continuous motions and small interval intermittent motions, with respect to the movement of the boats through the furnace.

In the preferred embodiment of the invention the speeds employed have ranged from .05 inch per minute to 4 inches per minute. This range of speeds will produce the desired disc characteristics when the furnace temperature is somewhere in the range between 1200° C. and 1300° C. Furnace temperatures below 1200° C. may be used in the process but it has been found that the variations in electrical properties of the product increase. If furnace temperatures above 1300° C. are used, furnace deterioration increases.

The variation of temperature in the furnace along the path of the disc carrying boats 27 is an important factor in determining the velocity of the discs through the furnace and consequently is determinative of how long the discs will remain in the furnace. For a temperature range from 99 per cent to 100 per cent of the maximum temperature along the axis of the furnace tube 8, the length of the zone is about 4½ inches when the maximum temperature is between 1250° C. to 1300° C. For the same maximum temperature and a variation of said temperature within the furnace of from 95 per cent to 100 per cent along said path, the path of the discs should be about 10½ inches long to produce varistors having the same electrical properties as those described immediately supra. For a range of from 90 per cent to 100 per cent the path should be 13½ inches long. It is assumed that the velocity of the discs through the furnace for the above instance is approximately 0.4 inch per minute. Variations of speed will necessitate a change in either maximum temperature distribution and/or length of said path.

The conductivity of the varistor is a complex exponential function of the time and temperatures of firing. This is probably a consequence of the maturing of the varistor being dependent on chemical reactions whose rates are exponential functions of the firing temperature. Furthermore, since the electrical characteristics of the varistor product are dependent in a complex manner upon the rate of motion of the varistor through the furnace, the maximum indicated temperature, and the temperature distribution within the furnace, a certain flexibility of furnace design, choice of firing temperature, and rate of motion of the discs therethrough is permissible. These factors however, make it difficult to specify any exact firing time independent of the specific furnace used and the particular batch of raw materials. The optimum requirements for furnace temperature, temperature gradients, and rate of speed of the discs through the furnace may be determined by a test firing for each new batch of material, because this now appears to be the most precise and economical method for integrating all these factors which contribute to the variation of the varistor characteristic.

Upon completion of the firing of the varistor discs provision should be made to remove the fired discs from the furnace at a time when they are at a temperature slightly higher than room temperature. This should be done without disturbing the flow of gas through the furnace and without contamination of gases within the furnace.

The boats employed to carry the varistor units in this preferred embodiment of the invention can be semicylindrical in shape and having a diameter of about 1¾ inches, a length of about 7⅜ inches, and ⅛ inch thick walls. They should be made of high temperature, high purity aluminum oxide. The discs preferably are supported in a vertical position, that is edgewise, and perpendicular to the edge of the boat in one or two rows. Each disc rests on edge in an individual slot cut into the boat.

The above-described process is capable of producing varistors having a variability of the voltage drop across the varistor with a given current of from ±4 per cent to ±10 per cent depending on the portions of the varistor characteristic curves at which operation is conducted.

One electrical characteristic of a varistor can be expressed by the equation $IR=E^n$ where $n$ is some exponent greater than unity. It is desirable to have $n$ as large as possible with as small an R as is possible. The value of $n$ of varistors made by this process has been found experimentally to be greater than the value of $n$ of varistors made by other known processes. Also advantageously the value of resistance of varistors made by this process at a given current can be as low as one-fifth the resistance of varistors made by other processes. In addition, the stability of the voltage current characteristics of the varistors described herein is considerably higher than the characteristics for varistors made by other processes.

It is to be understood that the invention described herein is to be taken as a preferred embodiment of the same and that various changes in temperatures, quantities and elements may be resorted to, without departing from the scope or spirit of the invention.

What is claimed is:

1. In the process of forming a conductive element containing silicon carbide, the step of firing the body of said element in an atmosphere containing from 20 to 100 per cent carbon monoxide.

2. In the process of forming a conductive element containing silicon carbide, the step of firing the body of said element in an atmosphere of hydrogen and carbon monoxide including from 20 to 100 per cent of the latter.

3. In the process of forming a conductive element containing silicon carbide, the step of firing the body of said element in an atmosphere of hydrogen and carbon monoxide and at a temperature of from 1000° C. to 1400° C.

4. The process of forming a conductive element containing silicon carbide comprising the steps of shaping the element, placing the element in a furnace having an atmosphere of hydrogen and carbon monoxide including from 20 to 100 per cent carbon monoxide, and maintaining said atmosphere at a temperature in the range of from 1000° C. to 1400° C. during the firing process.

5. The process of forming a conductive element containing silicon carbide comprising the steps of shaping the element into a plate, firing the element in a 20 to 100 per cent carbon monoxide atmosphere furnace at a substantially constant temperature in the range of 1000° C. to 1400° C., and then coating the plane surfaces of the said plate with a conducting material.

6. The process of forming a conductive element containing silicon carbide which comprises mixing the material including said silicon carbide, forming said material into the desired body form, placing said body in a controlled atmosphere containing from 20 to 100 per cent carbon monoxide and firing said body at from 1000° C. to 1400° C. in said atmosphere.

7. The process of forming a conductive element of material comprising silicon carbide, which comprises mixing the material including said silicon carbide forming said material into the desired body form, placing said body into a controlled atmosphere containing hydrogen and carbon monoxide including from 20 to 100 per cent of the latter, and firing said body at from 1000° C. to 1400° C. in said atmosphere.

8. The process of forming a conductive element of material comprising silicon carbide, clay, and graphite which comprises the steps of mixing the material including said silicon carbide, forming said material into a desired body form, placing said body in a controlled atmosphere containing hydrogen and from 20 to 100 per cent carbon monoxide, and firing said body at a substantially constant temperature in the range from 1000° C. to 1400° C.

9. The process of forming a conductive element containing silicon carbide comprising the steps of shaping the element body, placing the body in an atmosphere of hydrogen and carbon monoxide in about equal proportions, and firing the body in the temperature range from 1200° C. to 1300° C. while maintaining said atmosphere around the body.

HANS F. DIENEL.
GORDON K. TEAL.

REFERENCES CITED

The following references are of record in the file of this patent:

UNITED STATES PATENTS

| Number | Name | Date |
| --- | --- | --- |
| 1,951,133 | De Bats | Mar. 13, 1934 |
| 2,112,777 | Hauser | Mar. 29, 1938 |
| 2,128,289 | Dubilier et al. | Aug. 30, 1938 |
| 2,371,420 | Blaha | Mar. 13, 1945 |